United States Patent [19]

Gerking et al.

[11] Patent Number: 4,540,774
[45] Date of Patent: Sep. 10, 1985

[54] PROCESS FOR THE CONTINUOUS DEMONOMERIZATION AND POSTCONDENSATION OF POLYAMIDE 6 AND DEVICE FOR CARRYING OUT THIS PROCESS

[75] Inventors: Lüder Gerking; Günter Panke, both of Berlin, Fed. Rep. of Germany

[73] Assignee: Karl Fischer Industrienlagen GmbH, Berlin, Fed. Rep. of Germany

[21] Appl. No.: 658,817

[22] Filed: Oct. 9, 1984

[30] Foreign Application Priority Data

Oct. 7, 1983 [EP] European Pat. Off. ........ 83730095.3

[51] Int. Cl.³ .............................. C08F 6/00; C01F 7/00
[52] U.S. Cl. ..................................... 528/502; 528/323; 528/326
[58] Field of Search ......................... 528/323, 326, 502

[56] References Cited

U.S. PATENT DOCUMENTS

| | | | |
|---|---|---|---|
| 2,833,750 | 5/1958 | Vickers | 528/502 |
| 3,578,640 | 5/1971 | Twilley et al. | 528/315 |
| 3,579,483 | 5/1971 | Twilley et al. | 528/323 |
| 3,786,103 | 1/1974 | Takamatsu et al. | 528/502 |

FOREIGN PATENT DOCUMENTS

| | | |
|---|---|---|
| 658309 | 7/1965 | Belgium. |
| 1202251 | 10/1965 | Fed. Rep. of Germany. |
| 1570570 | 3/1970 | Fed. Rep. of Germany. |
| 1218110 | 2/1972 | Fed. Rep. of Germany. |

*Primary Examiner*—Ronald W. Griffin
*Attorney, Agent, or Firm*—Morgan, Finnegan, Pine, Foley & Lee

[57] ABSTRACT

This invention relates to a process for carrying out continuous demonomerization and postpolymerization of Polyamide 6 melts and a reactor for carrying out this process. The reactor of this invention has a cylinder with a horizontal axis around which an interior rotor shaped like a cage rotates. The reactor can be partially filled with polymer melt. There is a multitude of elements along the periphery of the rotor which partly dip into the melt and serve to convey the melt through the reactor, generate new surfaces and mix and homogenize the melt as the polymer melt undergoes demonomerization and postpolymerization under vacuum.

12 Claims, 2 Drawing Figures

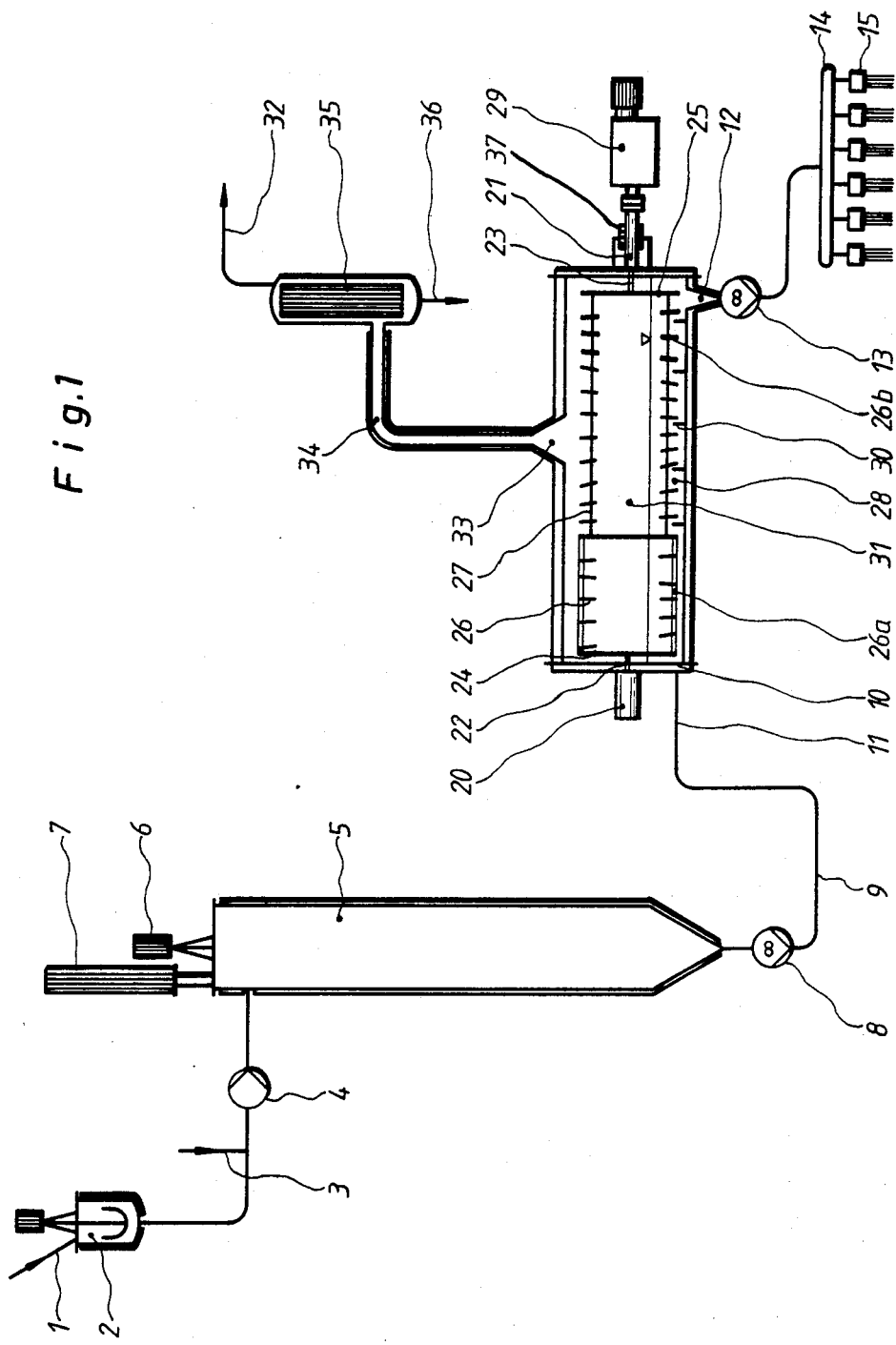

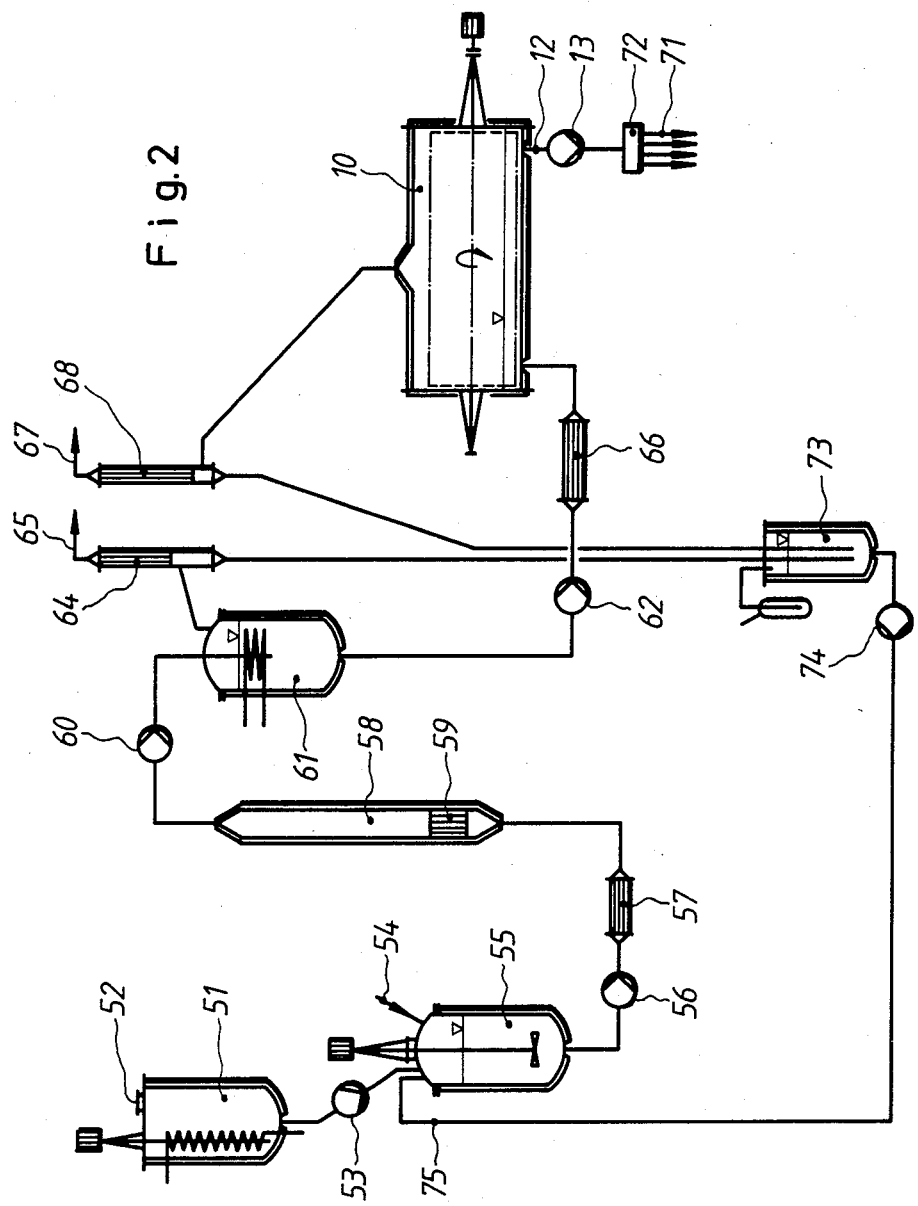

PROCESS FOR THE CONTINUOUS DEMONOMERIZATION AND POSTCONDENSATION OF POLYAMIDE 6 AND DEVICE FOR CARRYING OUT THIS PROCESS

This invention relates to a process for the continuous demonomerization and postpolymerization of Polyamide 6 (polycaproamide) melts and to a device for carrying out this process.

Polyamide 6 is generated by polymerizing ε-caprolactam to form a polymer melt. The obtained polymer melt is preferably processed directly into shaped articles such as filaments or films.

When polymerizing polyamide 6, liquid ε-caprolactam is converted under heat into a polymer in a one or multiple stage process by adding water or other catalysts. This polymer still contains approximately 10% monomers and oligomers, i.e. approximately 60–70% monomers and 30–40% oligomers (dimers, trimers, and higher oligomers). When using the polymer later on, e.g. for textile filaments, those monomers, as well as the oligomers, are disadvantageous for the following processes and the final end use. Consequently they must be removed. The polymerization of Polyamide 6 is a simple process (e.g. in a one-stage VK-tube), compared to other polymers, but it must be completed by process stages in which monomers and oligomers, the so-called residual extractables, are removed. Various processes have been used for several years, in which the polymer is first processed into granulates or chips and then extracted under water such that the polymer has residual extractables of less than 1%. Subsequently, the granulates must be dried and, for further treatment, remelted in extruders. Other processes are known, in which demonomerization takes place in the melt, either by distillation of the low molecular weight parts by means of an inert adsorbing gas like nitrogen or steam, or by the often-used process of vacuum distillation.

In this case the prepolymer is led to a further stage, at an equilibrium with a low-molecular weight part of approximately 10% or higher, before equilibrium is achieved. In this stage, the low-molecular weight parts are removed, and it is then possible to carry out a postpolymerization/postcondensation in molten condition, too.

However, all the known processes have one common disadvantage: several devices must be used in series for carrying out the following stages: demonomerization, homogenization, intensive mixing and adjustment of equilibrium accomplished by keeping a certain retention time under constant temperature conditions, as well as possible postpolymerization. Indeed, there exist devices for carrying out some of these process stages, but not one for all of these necessary steps.

DE-PS Pat. No. 12 18 110 describes a process for reducing residual extractables (monomers and oligomers) in two vacuum treatments. During these two treatments the polymer is postcondensated, i.e. three process stages in three different devices follow the first polymerization. The post-polymerization may be carried out in the pump of a thin film evaporator. However, the retention times of the individual polymer parts between sump surface and outlet are very dissimilar, due to the fact that no forced conveyance exists between the sump and the outlet.

U.S. Pat. No. 3,578,640 describes a process wherein a polymer, generated in a pre-polymerizer and a polyaddition reactor is led to a vacuum evaporator and subsequently through a final reactor by means of a screw. In this process, too, one has to demonomerize and postcondensate in two devices. The final reactor simultaneously serves to homogenize the melt. A similar process is described in the German OS No. 15 70 570. However, the idea of using a so-called "spiral screw evaporator" has never been realized. It would have the following disadvantages: due to the necessary conveyance by means of the steadily operating screw, the retention times are very short, though they might be sufficient for some demonomerization; and in the case in which less melt is discharged at the outlet than is conveyed by the screw, reflux would become uncontrolled. Thus, retention times would be nonuniform. Furthermore, this application does not mention any simultaneous postpolymerization of the melt.

SUMMARY OF THE INVENTION

The purpose of the present invention is to carry out the reaction steps of demonomerization, (removal of monomer ε-caprolactam and oligomers) and the postpolymerization of the melt in only one process stage. According to this invention the demonomerization and the postpolymerization are simultaneously executed under vacuum in one reactor, which is partly filled with the polymer melt. This reactor is designed as a cylinder with a horizontal axis. It contains a rotor in the form of a cage, arranged concentrically around the horizontal axis and movable around this reactor axis. At the periphery of the reactor, ring-shaped elements and/or perforated plates and/or spoke wheels are fixed, said elements being capable of partly dipping into the melt.

The ring-shaped elements in the horizontal reactor, in which a certain melt level should be maintained, dip into this melt to perform the following steps: conveyance of the melt longitudinally through the reactor, generation of new surfaces, and mixing and thus homogenizing the melt. Such a reactor is already known from the German Pat. Nos. 21 00 615 and 21 14 080 dealing with the production of polyester.

The annular cage should have no central shaft where polymer parts might settle and remain for different retention times. Only ring-shaped elements dip into the melt. These elements can be designed as disks, perforated disks, sieve disks or spokes. In the first, low-viscosity part they can be fitted with bucket bars. These elements transport the melt to the top of the reactor from where it falls down again in form of a film due to its weight. The surface of the melt level is relatively small. But due to the formation of film at the ring-shaped elements, new and very large surfaces are steadily and continuously formed. The ring disks are steadily cleaned by the shear stresses below the melt level. Consequently there will be no uncontrolled, different or variant retention times. At the same time the melt is mixed when the ring-shaped elements dip into the melt. By a certain inclination of the ring-shaped elements, the conveying speed through the whole device can be given or fixed. This conveying speed may be varied during the operation by modifying the speed of the rotor within certain limits. Weirs are fixed at the bottom of the reactor, preventing the melt from flowing straight alongside the bottom without being raised above the melt level by means of the rotating elements.

The use of the disk reactor allows a better demonomerization and postcondensation of Polyamide 6 in the liquid phase than known processes. It is possible to feed a prepolymer as well as a ready polymer from an earlier polymerization stage, which is preferably also continuously operating. Therefore it is also possible to feed melt into the disk reactor, which has, for example, been generated by extrusion of granulate which comes from discontinuously operating autoclaves. In the latter case several autoclaves can alternatively be discharged into an intermediate tank, from which the reactor is fed.

BRIEF DESCRIPTION OF THE FIGURE

A preferred embodiment of the process and the reactor of this invention is shown in FIG. 1.

Another preferred embodiment of the process and the reactor of this invention is shown in FIG. 2.

DETAILED DESCRIPTION OF THE PREFERRED EMBODIMENTS

The process of this invention is preferably operated as a fully continuous process in which Polyamide 6 polymer is produced in two vessels. Feedstock is liquid $\epsilon$-caprolactam. Subsequently, this polymer is directly processed into filaments or films. The liquid-solid extraction may be omitted as well as the drying and remelting processes and the postcondensation in solid state, such as in the case where relative viscosities of $\eta$ rel of up to approximately 4 (measured at 20°–25° C. 1 g polymer per 100 cm$^3$ of sulphuric acid of 96%) are wanted, e.g. for technical yarns.

The polymerization plant has two stages, one VK-tube and one disk reactor. Referring to FIG. 1, in the case in which solid lactam is to be processed, it is steadily fed at 1 into a heated solving tank 2, which is fitted with an agitator. It leaves this tank in liquid form. It is possible to feed additives into this solving tank 2, especially an additive such as water serving as catalyst, but also chain limiters like acetic acid and pigments like TiO$_2$, which may also be fed at 3 into the lactam flow. A dosing pump 4 conveys the mixture into the upper part of the first polymerization stage, in this case a VK tube 5. An agitator 6 may be arranged in the upper part of the tube 5. Vapour condensers 7 are fixed at the head of the VK-tube 5, serving to condense of the escaping lactam and steam. When these vapours become liquid again, they again flow into the VK-tube 5 whereas the steam that is necessary for inducing the polymerization process leaves. Such VK-tubes are well known to those skilled in the art. They are heated from the outside and/or in their interior by means of heating coils or plate heat exchangers. These are preferably heated by Diphyl (a mixture of diphenyloxid and diphenyl known as Dowtherm) vapors. A discharge pump is installed below the outlet of the VK-tube which keeps the product flow constant, e.g. by gear pump 8. Gear pump 8 then transports the prepolymer via a product line 9 into the reactor 10 from the bottom at point 11. The polymer leaves the reactor at the outlet socket 12 and is then led by a dosing gear pump 13 via a melt distributor 14 to the individual spin positions 15. The pump 13 generates the pressure that is necessary to press the melt in the spin positions via spinnerets (not shown in detail) into the form of filaments. As is known, the filaments are taken off via quenching devices (not shown) and spin finish applicators and are wound-up on bobbins, in case filaments are required. If fibers have to be produced they are led via take-off devices forming fiber cables, they are deposited in cans and then stretched on drawing frames. It is also possible nowadays to stretch cables without depositing them. The fiber cables are then cut to staple fibers. For film production the melt is pressed at 15 through slit nozzles instead of spinnerets. For granulate production, the polymer wires, diameter 1–3 mm, are pressed out, cooled down in a water bath and then cut into chips.

The disk reactor is fitted with a rotor, that is borne at points 20 and 21 by pivots 22 and 23.

The rotor consists of the ring-shaped elements 26, which are combined with each other by crossrods or tie bolts 27. The rotor is connected to the pivots 22 and 23 by end plates or spoked wheels 24 and 25. The ring-shaped elements form a cylindrical cage without a shaft inside. The liquid level 28 is maintained by liquid level indicators, which are known but not shown expressly here. The liquid level indicators also control the speed of the discharge pump. The retention time of the melt in the reactor is determined by the height of the liquid level. The rotor is turned by drive 29. During one turn, the ring-shaped elements dip into the melt, move through it and take the liquid melt along their surfaces as they leave it. At 31, above the melt level 28, the volatile particles of the melt, i.e. water and monomer as well as oligomers, are allowed to escape. Evaporation is enforced by keeping this room or space under vacuum which is—as it is well known—attained by vacuum pumps or vacuum jets at 32. The vapors leave at 31 via the outlet socket 33 and pipe line 34 which leads into a condenser 35, where—as it is well known—the volatile lactam and the oligomers are separated by means of cooling surfaces or spray condensers. The condensates leave at 36.

The ring-shaped elements 26 are arranged in a certain angle to the end plates 24 and 25. The inclination of each following plate is shifted by a certain angle rotary-wise. When following the points of the ring-shaped elements, being next to the end plate 24, those "trailing points" form a screw line. In case of right rotating direction, the melt is conveyed from 1 to 12. It has been proved to be advantageous to install beside the ring-shaped elements, additional bucket bars 26a at the inlet section where the melt is much thinner than at the outlet. However, it is preferred to install only rings and spoked wheels 26b at the other, outlet end. Wires 30 are fixed at the reactor bottom, preventing a direct melt flow alongside the reactor bottom.

The reactor is preferably operated under vacuum. Consequently, the driving shaft operating outside at 37 must be made vacuum-tight. For this purpose, combinations of labyrinth and slide packings are preferred.

Compared to well-known processes of degasification of melts (such as degasifying extruders as well as thin film evaporators with rotating blades) and compared to postcondensation equipment often of similar or even of the same design but operated under lower vacuum, the reactor of this invention meets all three requirements stated above much better, i.e. the steady generation of new surfaces in form of thin layers, from which water, monomers and oligomers are removed; the intensive mixing of the reactor content; and the achievement of a certain rate of polymer transport through the reactor pump, which is necessary for keeping a narrow retention spectrum of the melt. By using only one piece of equipment for these requirements, the equipment costs are much lower. The requirements the final product has to fulfill, i.e. low residual extractables as well as equal or possibly higher viscosity is met and—contrary to the processes known hitherto—the results improve in general. The process described with FIG. 1 allows the production of filaments with residual extractables of lower than 2%. Depending on the retention time of the polymer melt in the two stages, VK tube 5 and reactor 10, the relative viscosities at 8 may be about 1.9 to 2.2, residual extractables about 10-14%, leaving at 12 with viscosities of about 2.5 to 4 and residual extractables of less than about 1.5%. In order to keep the increase of the residual extractables in the distribution lines 14 to 15 as low as possible, they must be as short as possible. Operating temperature must be as low as possible.

It is advantageous to increase the melt temperature in line 9. Due to the evaporation of water and monomers, the melt is cooled down and thin layers are hindered from forming. It is possible to increase the removal of the low molecular weight part by feeding nitrogen or steam into the reactor. It is also possible to feed pigments like $TiO_2$ into the reactor, e.g. into the main flow 11 prior to the polymerization process. The alteration of polymer delusterant degree by different feeding of $TiO_2$ or the pigment change will take less time than cleaning the whole VK tube.

As already known, it is possible to increase the capacity of a VK tube by pre-connecting a prepolymerizer working under pressure. In this case the process according to the invention would preferably have three stages. FIG. 2 shows such a process.

Though it is easy to carry out polymerization in a VK-tube, it has two disadvantages: the retention time—mostly more than 20 hours, at least approximately 12 hours—is high and the retention time spectrum differs because the maximum speed in the center is about twice as high as the average speed. Toward the wall of the VK-tube the speed decreases to zero. The characteristics of the parabolic velocity profile of a laminar pipe flow (Hagen-Poiseuille flow) may be modified by internals with repeated flow deviation and flow splitting. Thus, the retention time spectrum of the polymer parts would be improved. However, it needs larger expenditures and involves problems such as deposits on the inserted surfaces. The process shown in FIG. 2 has three process stages instead of two as shown in FIG. 1. However, the retention time in the first two stages of the embodiment depicted in FIG. 2 is shorter. Thus, deviation of about 10 to 20% from an average retention time result in most cases in less than one hour instead of several hours.

Referring to FIG. 2, solid, flake-shaped caprolactam is fed into a melting tank 51, heated from outside by jacketed walls, is melted and then led to a heated intermediate tank 55, into which additives like acetic acid as chain limiter, water for starting polymerization and delusterant agents (generally $TiO_2$) and other additivies like thermal stabilizers are fed.

By means of a dosing pump 56 the lactam mixture, which is slightly heated, is led to a tube heat exchanger 57, under an overpressure of more than 2 bar, preferably more than 3 to 10 bar. There it is heated, preferably by Diphyl vapors up to 220° C. This temperature is necessary for the beginning of the reaction process. The mixture afterwards reaches a prepolymerizer 58. It is also possible to use vessels with agitators. The better retention time distribution, however, is that of tube reactors, shown at 58. This tube reactor may have additional heat exchangers 59 inside, such as plates, flat chambers or tubes. Often it is sufficient, if the capacity and thus the diameter of the tube reactor is low, to heat the tube reactor only at the outside jacket and, if necessary, to provide for a mixing of the medium, flowing from the bottom to the top, using static internals not shown in FIG. 2. This would prevent one part from always flowing along the wall, and the other part always flowing in the middle. Depending on the process setting with regard to water content, pressure, temperature and retention time a more or less viscous prepolymer leaves the prepolymerizer 58 and goes via a dosing pump or via a throttling device which maintains constant pressure 60 to a relaxation vessel 61. This vessel at its top is equipped with heating coils, compensating for the evaporation heat of escaping monomers, oligomers and water, of the prepolymer. A first demonomerization takes place using vacuum equipment that is not shown here, but only indicated by a condenser 64 and the path the non-condensed liquids will take to arrive at the demonomerization equipment (arrow 65). It takes place under a pressure of about 50-800 Torr in the relaxation vessel 61 in the lower part of which the melt is post-condensed. A prepolymer leaves this vessel with reduced extract content and a higher degree of polymerization compared with the state when it enters relaxation vessel 61 between the tubes of the heat exchanger at the top. The prepolymer enters the disk reactor 10 via a dosing pump 62.

The connecting piping between the tanks 51, 55, 59, 61 and 10 is jacketed, as known to those of skill in the art, and heated by Diphyl, which serves as a heat transfer medium.

The pressure in the final reactor 10 is lower compared to that in the relaxation vessel 61, i.e. preferably below 20 Torr. In order to achieve a higher demonomerization of essentially lower than 2% residual extractables, the vacuum must be less than about 3 Torr. This vacuum is achieved by means of pumps which are not shown but only indicated by arrow 67 and works via condenser system 68. The operation of the reactor is the same as that previously described before. Strands, filaments or films 71 are spun out of the casting head 72 via the socket 12 and a discharge pump 13. Alternatively, the melt is led via distributing manifolds to several spin systems.

The separated monomers and oligomers will be liquefied and then led to a collecting tank 73. From there they are entirely, or partly, recycled to the beginning of the process at 75 by means of a pump 74. This results in a very economical process. It has been shown that the recycling of the material extracted out of the melt is easy and shows no problems in case of simpler products such as staple fibers, various plastic applications, carpet yarns and technical yarns produced. This is especially true for the use of a prepolymerization under pressure. But even fine textile filaments allow a high degree of recirculated extractables, especially in case part of the oligomers are removed by sedimentation, because the oligomers are the main cause of the formation of knots in filaments which consequently cause thread breaks.

EXAMPLE 1

In a one-stage VK-tube a polymer was produced from 98% caprolactam, 1.9% water and 0.1% acetic acid at a throughput of 20.8% kg/h which was discharged by means of a gear pump at a temperature of 276° C. The residual extractable content was 10.3% $\eta$ rel (with extract)=1.98. In the connecting line to the reactor the melt was heated up to 290° C. The reactor had a diameter of 660 mm and a length of 1.450 mm.

The rotor, moving inside, consisted of perforated plates and rings fixed at spoked wheels. These spokes were laterally connected to a rigid cage. The average retention time of the melt in the reactor was 3.8 hours. The polymer was led through an additional gear pump and melt lines to a spinneret where it was spun into threads. The retention time between reactor and spinneret was approximately 25 minutes. Residual extractables of the threads were 1.42% and viscosity was at $\eta$ rel=3.23.

By means of a vacuum pump the pressure in the reactor was kept at 3.5 Torr. Part of the escaping monomer and part of the oligomers were condensed in a condenser with internal cooling surfaces. The line between reactor and condenser was heated with hot water. The temperature of the reactor itself at its outer jacket was kept at 284° C. by means of Diphyl vapor heating. Rotor speed was 1.5 rpm.

EXAMPLE 2

Under the same conditions as in example 1 the pressure in the reactor was kept at 10–12 Torr. Steam was fed into the upper part of the reactor at a rate of 3% of the polymer throughput. The viscosity remained practically unchanged. Residual extractables were 1.66%.

EXAMPLE 3

Polyamide 6 granulates with residual extractables of 8.4% and $\eta$ rel=2 were molten in an extruder and led into the reactor via a heated line, as in example 1. The pressure in the reactor was 5 Torr, throughput of granulates 19.2 kg/h. All other conditions in the reactor were the same. Residual extractables of the spun filaments were 1.5% and $\eta$ rel=3.26.

From the above three examples one can, among other things, see the influence of the most important process parameter which is the underpressure in the reactor. It is possible to attain residual extractables of about, and lower than, 2% at pressures of less 15 Torr. In order to achieve residual extractables of less than 1.5%, the pressure must be lower than 5 Torr. In order to achieve residual extractables of essentially lower than 1.5%, the pressure in the reactor must be lower than 3 Torr.

EXAMPLE 4

A mixture consisting of 98.4% caprolactam, 1.5% water and 0.1% acetic acid was preheated up to 65° C. At a throughput of 30.5 kg/h it was fed into a tubular prepolymerizer by means of a dosing pump and under over-pressure of 6.2 bar. This prepolymerizer was heated from outside. By heating the tube jacket, the temperature in the reactor remained nearly constant, i.e. at 262° C. The pressure decrease, caused by the hydraulic pressure drop in the prepolymerizer, was negligible. The retention time was 2.5 hours.

The relative viscosity of the melt was $\eta$ rel=1.52 when it was leaving the prepolymerizer. Residual extractables were 12%. The melt entered a relaxation vessel via a dosing pump. The relaxation vessel was heated from outside by a jacket and inside by heating coils. The pressure inside the vessel was 50 Torr. Part of the monomers and oligomers was evaporated. The pressure was kept constant by means of vacuum equipment. A first postcondensation took place. When leaving the relaxation vessel the relative viscosity of the melt was 1.9. Subsequently it entered the sump of the same disk reactor outlined in Example 1. In the disk reactor, the walls of which were heated up to 284° C., the polymer melt was retained for 1.9 hours at 0.8 Torr. Afterwards it was spun to threads. The threads had a rel. viscosity of 2.84 and residual extractables of 1.52%.

What is claimed is:

1. A process for the continuous demonomerization and postpolymerization of polyamide 6 melts, comprising carrying out said demonomerization and postpolymerization in a reactor partly filled with a polymer melt, said reactor comprising a cylinder having a horizontal axis, an interior rotor in the form of a cage arranged concentrically around said reactor axis and rotatably movable around said axis, said cage having around its periphery a plurality of ring-shaped elements which partly dip into the melt.

2. A process according to claim 1 wherein said ring-shaped elements are perforated plates, disks or spoked wheels.

3. A process according to claim 1 wherein said ring-shaped elements incline toward a plane vertical to the reactor axis.

4. A process according to claim 3 wherein the inclination of each element toward the plane vertical to the reactor axis differs from the inclination of each adjacent element by a fixed angle in a screw-like manner.

5. A process according to claim 1 wherein said rotor is in the shape of a cage having rods arranged parallel to the reactor axis thereby connecting the ring-shaped elements.

6. A process according to claim 5 wherein said cage has additional bucket bars at its periphery which extend over at least part of the reactor.

7. A process according to claim 1 wherein said process takes place at a pressure of less than 15 Torr.

8. A process according to claim 1 wherein the polymer melt has been polymerized to an equilibrium of about 10 percent by weight in one or more pre-stages.

9. A process according to claim 1 wherein the polymer melt has a percentage of low-molecular weight portion which is higher than that at equilibrium.

10. A process according to claim 1 wherein an inert gas under vacuum is placed into said reactor.

11. A process according to claim 10 wherein said gas is nitrogen or steam.

12. A process according to claim 10 wherein about 50% to about 100% of monomers which are produced during the demonomerization are recycled to the beginning of said process.

* * * * *